Patented Jan. 27, 1942

2,271,364

UNITED STATES PATENT OFFICE 2,271,364

REFRACTORY CHROMITE CASTING

Theodore E. Field, Louisville, Ky., assignor to Corhart Refractories Company, Louisville, Ky., a corporation of Delaware No Drawing. Application October 11, 1939, Serial No. 299,039

3 Claims. (Cl. 106—63)

In my co-pending application, Serial Number 299,037, filed October 11, 1939, are described refractory compositions in which chromites of the alkaline earths are the resistant crystal phases. These refractories in use show extreme resistance to corrosion by glass both at and below the glass line but have a tendency to corrode in the alkali vapors above the glass line which corrosion was attributed to oxidation to alkali or alkaline earth chromate. It is the purpose of this invention to improve such refractories by additions to these compositions to diminish the erosion above the glass line without materially affecting the resistance to chemical solution at or below the glass line.

Refractories of the present disclosure are to be melted and cast substantially with the tchniques disclosed in U. S. Patent #1,615,750 to Fulcher.

If erosion is due to oxidation to chromate, one recourse would be to dilute that phase with a non-oxidizing refractory phase such as alumina or zirconia. I have discovered indeed that both alumina and zirconia in significant percentages do have the property of preventing this erosion. Unfortunately however both of these oxides increase the corrosion at the glass line presumably because they turn out to be incompatible with the chromite phase, chromic oxide and a poorly resistant alkaline earth aluminate or zirconate being formed instead. Because of the powerful coloring action of dissolved $Cr_2O_3$ upon clear glasses any addition producing an increase in this solution is considered unsatisfactory.

In my aplication, Serial Number 299,038, are disclosed refractories in which ferrous chromite is a major constituent. Contrary to what one might expect I have found that ferrous chromite castings do not erode above the glass line under conditions which produce erosion with the alkaline earth chromites. When iron oxide as well as alkaline earth is melted with chromic oxide I have found that both chromite phases are obtained and the ferrous chromite imparts to the alkaline earth chromite its relative immunity to erosion above the glass line. Since the resistance of ferrous chromite at the glass line is slightly greater than that of the alkaline earth chromites no significant decrease in resistance occurs when the phases are simultaneously present. The new refractory therefore has the resisting properties of the previously disclosed ferrous chromite but also takes advantage of the cheapness of the alkaline earths.

If natural ores of the latter are used such as magnesite, dolomite, limestone, gypsum, strontianite, celestite, witherite or heavy spar, the acidic groups are eliminated as gas at the temperature reached in melting and cause no harm. However, the impurities of silica especially should be kept as low as possible as silica forms a poorly resistant glass phase with the major constituents. Purer grades can also be used of course but at an increase in cost. Chrome green oxide as produced commercially may be used for the chromic oxide. Iron oxide may be conveniently added either as the black magnetic oxide, $Fe_3O_4$, or as the red $Fe_2O_3$. The excess oxygen in these materials is an advantage in that it partly counteracts the tendency of the graphite electrodes to reduce the metallic oxides.

As was found for the previous chromite refractories, an excess of $Cr_2O_3$ does no harm but an excess of iron oxide or of alkaline earth or both rapidly increases corrosion at the glass line. As suitable batches illustrating the above principles the following may be cited.

1

| Batch | Batch analysis | | |
|---|---|---|---|
| | $Cr_2O_3$ | $Fe_2O_3$ | MgO |
| 76 chrome green oxide | 76 | | |
| 10 burned magnesite | | | 10 |
| 14 red iron oxide | | 14 | |
| | 76 | 14 | 10 |

2

| Batch | Batch analysis | | |
|---|---|---|---|
| | $Cr_2O_3$ | CaO | $Fe_3O_4$ |
| 67 chrome green oxide | 67 | | |
| 13 burned lime | | 13 | |
| 20 black iron oxide | | | 20 |
| | 67 | 13 | 20 |

3

| Batch | Batch analysis | | |
|---|---|---|---|
| | $Cr_2O_3$ | SrO | $Fe_3O_4$ |
| 78 chrome green oxide | 78 | | |
| 11 black iron oxide | | | 11 |
| 16 strontium carbonate | | 11 | |
| | 78 | 11 | 11 |

4

| Batch | Batch analysis | | |
|---|---|---|---|
| | $Cr_2O_3$ | BaO | $Fe_2O_3$ |
| 68 chrome green oxide | 68 | | |
| 23 barium carbonate | | 18 | |
| 14 red iron oxide | | | 14 |
| | 68 | 18 | 14 |

5

| Batch | Batch analysis | | |
|---|---|---|---|
| | $Cr_2O_3$ | BaO | $Fe_3O_4$ |
| 85 chrome green oxide | 85 | | |
| 5 black iron oxide | | | 5 |
| 13 barium carbonate | | 10 | |
| | 85 | 10 | 5 |

In the following claims I use the term "heat cast" to identify a refractory which forms from the solidification of molten material, thereby distinguishing it from a wet cast product.

What I claim is:

1. A heat cast refractory substantially free from silica and consisting essentially of ferrous chromite and at least one of the alkaline earth chromites.

2. A heat cast refractory substantially free from silica and consisting essentially of iron oxide, at least one of the alkaline earths and chromic oxide, the chromic oxide being in excess of that required to form the simple chromites.

3. A heat cast refractory substantially free from silica and containing by chemical analysis from 5 to 25% iron oxide, and from 10 to 45% of alkaline earths selected from the group consisting of MgO, CaO, SrO, and BaO, the remainder being substantially chromic oxide.

THEODORE E. FIELD.